United States Patent
Kusaka

(10) Patent No.: US 8,926,052 B2
(45) Date of Patent: Jan. 6, 2015

(54) METHOD OF DETECTING RESIDUAL QUANTITY OF INK, PRINTING DEVICE, PROGRAM AND STORAGE MEDIUM

(75) Inventor: Koji Kusaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 12/962,606

(22) Filed: Dec. 7, 2010

(65) Prior Publication Data

US 2011/0074843 A1    Mar. 31, 2011

Related U.S. Application Data

(62) Division of application No. 12/108,952, filed on Apr. 24, 2008, now Pat. No. 7,874,635.

(30) Foreign Application Priority Data

Apr. 27, 2007 (JP) .................... 2007-119909

(51) Int. Cl.
  *B41J 29/393* (2006.01)
  *G01F 23/292* (2006.01)
  *B41J 2/175* (2006.01)

(52) U.S. Cl.
  CPC ........... *G01F 23/2922* (2013.01); *B41J 2/1752* (2013.01); *B41J 2/17566* (2013.01)
  USPC .............................................. 347/19; 347/86

(58) Field of Classification Search
  CPC ..................... B41J 2/17566; B41J 2002/17573
  See application file for complete search history.

(56) References Cited

U.S. PATENT DOCUMENTS

| 5,975,665 A | 11/1999 | Torigoe et al. |
| 2003/0210289 A1 | 11/2003 | Yoshiyama et al. |
| 2005/0231547 A1 | 10/2005 | Hatasa et al. |
| 2007/0052741 A1 | 3/2007 | Yamamoto |

FOREIGN PATENT DOCUMENTS

| JP | 2000043287 A | 2/2000 |
| JP | 2003-063027 A | 3/2003 |
| JP | 2003-276216 A | 9/2003 |
| JP | 2004-142352 A | 5/2004 |

OTHER PUBLICATIONS

Machine translation of JP 2004-142352 A. (JP 2004-142352 A was published May 20, 2004).*
Human translation of JP 2004-142352 A. (JP 2004-142352 A was published on May 20, 2004.).*

* cited by examiner

*Primary Examiner* — Justin Seo
(74) *Attorney, Agent, or Firm* — Fitzpatrick, Cella, Harper & Scinto

(57) ABSTRACT

There are provided a method of detecting an ink residual quantity and a printing device which do not make an erroneous determination as to detection on presence/absence of ink without influence of ink mist generated in the middle of using a printing device on calibration of an optical sensor. Therefore, by performing allotment processing based upon ink tank memory element information, calibration of an optical sensor using a reflection portion equipped in the ink tank, in a state where it is determined that the ink is left in the ink tank.

6 Claims, 11 Drawing Sheets

| ADDRESS | |
|---|---|
| 0 | DEVICE ID |
| 1 | FLAG OF NO INK |
| 2 | CALIBRATION FLAG |
| 3 | PWM VALUE |

FIG.8

METHOD OF DETECTING RESIDUAL QUANTITY OF INK, PRINTING DEVICE, PROGRAM AND STORAGE MEDIUM

This application is a divisional of application Ser. No. 12/108,952, filed Apr. 24, 2008, now allowed, the contents of which are incorporated by reference herein.

BACKGROUND OF THE INVENTION

1. Field of the Invention

The present invention relates to a method of detecting a residual quantity of ink, a printing device, a program and a storage medium for calibrating an optical sensor.

2. Description of the Related Art

As a method of detecting a residual quantity of ink in an ink tank for an ink jet printing device, there is known a method of detecting a residual quantity of ink by sensing a reflection coefficient of a specific part of the ink tank changing with presence/absence of the ink by an optically reflective sensor (Japanese Patent Laid-Open No. 2000-43287).

In a case of the ink jet printing device, however, ink is ejected for printing at the time of carrying out the printing and therefore, ink mist generated inside the printing device may be possibly attached to the optical sensor. In consequence, as in the case of Japanese Patent Laid-Open No. 2000-43287, in a case of reading the reflection coefficient of the specific part of the ink tank by the optically reflective sensor, when the optical sensor is contaminated with the ink mist, the sensor may not possibly read the reflected light accurately. Besides, a detection characteristic of the optical sensor possibly largely changes due to aging or a deviation in optical mechanism accuracy of the optical sensor.

Therefore, for securing detection accuracy in an ink residual quantity at more than a predetermined level even if such a change of the detection characteristic occurs, there is known a method of carrying out calibration of the optical sensor to detect the ink residual quantity (U.S. Pat. No. 5,975,665). This method is a system which is provided with a circuit for being capable of adjusting sensitivity of the optical sensor and a reflective object for calibration disposed on a carriage, the sensitivity of the optical sensor a characteristic of which has changed by the object at the time of detecting the ink residual quantity is adjusted to a given level and the detection characteristic is corrected for securing detection accuracy.

However, the method of U.S. Pat. No. 5,975,665 has still the problem. Since the reflective object used for calibration of the optical sensor is installed inside the ink jet printing device, the reflective object is possibly contaminated by the ink mist. If the reflective object is contaminated, the detection characteristic by the calibration may possibly change depending on degrees of the contamination. Accordingly, since the contamination degree regularly changes caused by use of the ink jet printing device, the sensitivity of the optical sensor may not be possibly adjusted to a given level by calibration or an erroneous determination may be possibly made as to detection on presence/absence of ink, depending on the contamination degree of the reflective object.

SUMMARY OF THE INVENTION

Accordingly, an object of the present invention is provide to a method of detecting a residual quantity of ink, a printing device, a program and a storage medium which does not make an erroneous determination as to detection on presence/absence of ink without influence of ink mist generated in the middle of using the printing device on calibration of an optical sensor.

According to a first aspect of the present invention, a method of detecting an ink residual quantity comprising: irradiating light from a light-emitting portion of an optical sensor to a reflection portion provided in an ink tank detecting reflected light from the reflection portion by a light-receiving portion of the optical sensor and detecting presence/absence of ink in the ink tank based upon a detection signal of the light-receiving portion, further comprises: when the ink exists in the ink tank, calibrating the optical sensor based upon the detection signal of the light-receiving portion at the time it is detected by the optical sensor that the ink does not exist in the ink tank.

According to a second aspect of the present invention, a printing device which records an image by using ink in an ink tank equipped with a reflection portion comprises: an optical sensor including a light-emitting portion for irradiating light to the reflection portion and a light-receiving portion for receiving the reflected light from the reflection portion and calibration means which calibrates the optical sensor based upon a detection signal of the light-receiving portion at the time it is detected that the ink does not exist in the ink tank by the optical sensor when the ink exists in the ink tank.

According to a third aspect of the present invention, a program comprising: irradiating light from a light-emitting portion of an optical sensor to a reflection portion provided in an ink tank detecting reflected light from the reflection portion by a light-receiving portion of the optical sensor and detecting presence/absence of ink in the ink tank based upon a detection signal of the light-receiving portion, further comprises: when the ink exists in the ink tank, performing by a computer the process of calibrating the optical sensor based upon the detection signal of the light-receiving portion at the time it is detected by the optical sensor that the ink does not exist in the ink tank.

According to the first, the second or the third aspect of the present invention, light is irradiated from a light-emitting portion of an optical sensor to a reflection portion provided in an ink tank and the reflected light reflected from the reflection portion is detected by a light-receiving portion of the optical sensor. In addition, when the ink exists in the ink tank, the optical sensor is calibrated based upon a detection signal of the light-receiving portion at the time it is detected by the optical sensor that the ink does not exist in the ink tank, making it possible to determine presence/absence of ink with high reliability.

Further features of the present invention will become apparent from the following description of exemplary embodiments (with reference to the attached drawings).

BRIEF DESCRIPTION OF THE DRAWINGS

FIG. 8 is a diagram schematically showing a memory content of EEPROM in the printing device in FIG. 1;

DESCRIPTION OF THE EMBODIMENTS

Printing Device Body

Hereinafter, the present embodiment will be in detail explained with reference to the drawings.

Figure 1:
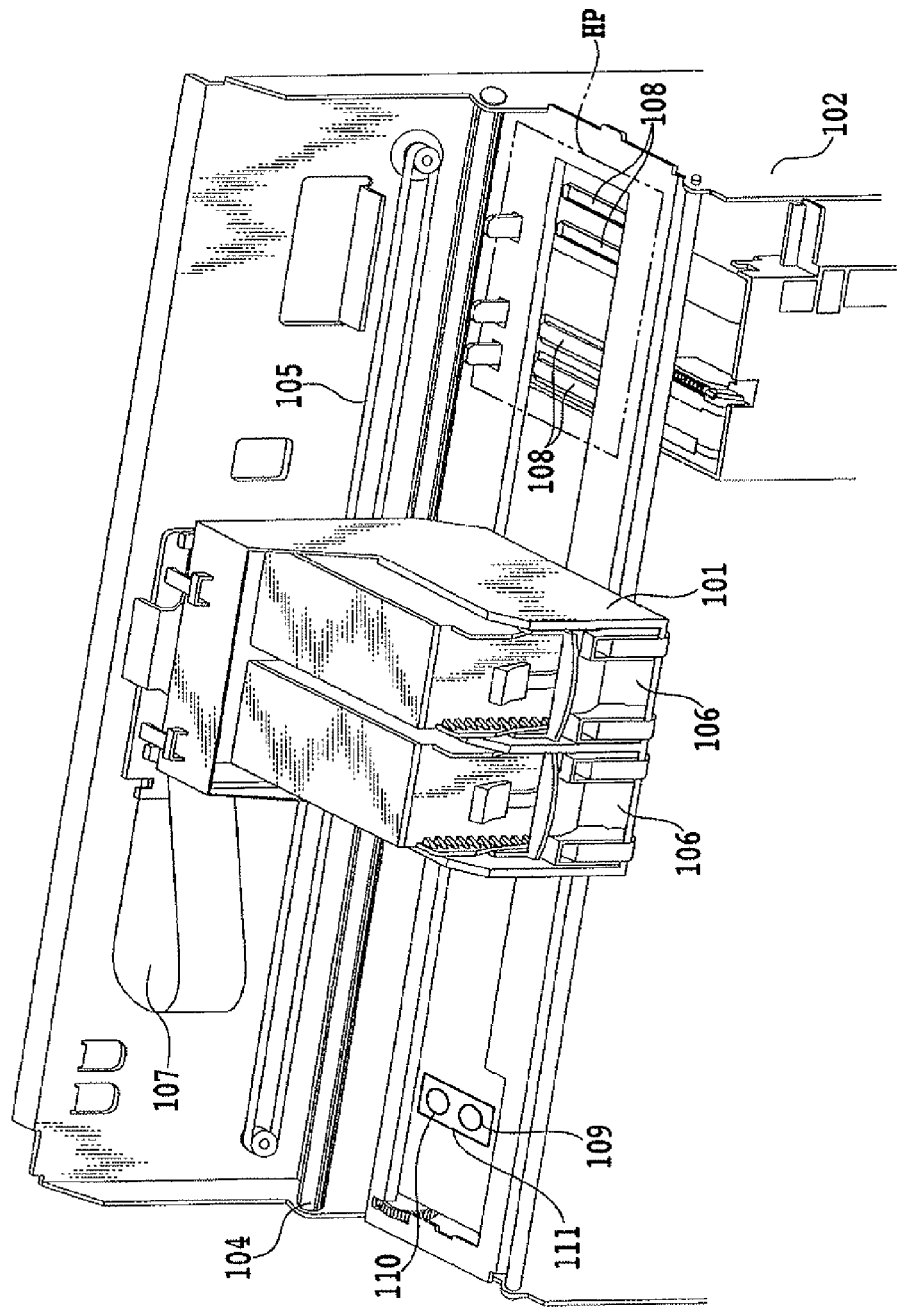
FIG. 1 is a schematic perspective diagram showing an entire construction of an ink jet printing device to which the present embodiment is applicable.

FIG. 1 is a schematic perspective diagram showing an entire construction of an ink jet printing device (hereinafter, simply referred to as printing device) to which the present embodiment is applicable. A carriage 101 mounting an ink tank is slidably supported by a guide rail 104 which extends in such a manner that both ends thereof are supported by an underbody 102. The carriage 101 is connected to a drive belt 105 for transmitting a drive force from a drive motor (not shown) and a flexible cable 107 for transmitting an image signal to printing heads 106 mounted thereon. Thereby, each printing head 106 ejects ink on a printing medium, for example, a printing sheet, thus making it possible to record an image or the like.

A home position HP disposed in one end of a travel range of the carriage 101 is provided with caps 108 for suction or protection for the purpose of eject recovery to the printing head 106 mounted on the carriage 101. By producing a negative pressure in a space between the cap 108 and the printing head 106 by a pump (pump means) (not shown) or by idling eject of the pump, clogging or the like of a eject port of the printing head 106 or an ink passage (nozzle) communicating therewith can be positively cleared. It should be noted that an ink tube is attached to the cap 108 in such a manner as to be in communication with an inside thereof for introducing ink ejected from the printing head 106 to a predetermined portion On the other hand, an optical sensor 111 which has a light-emitting portion 109 and a light-receiving portion 110 and is capable of being calibrated is attached to a side opposite to the home position HP within the travel range of the carriage 101. When the carriage 101 passes above the optical sensor 111, an optical detection of a residual quantity of ink inside the ink tank can be made.

(Ink tank)

The ink tank used in the present embodiment will be explained.

Figure 2:
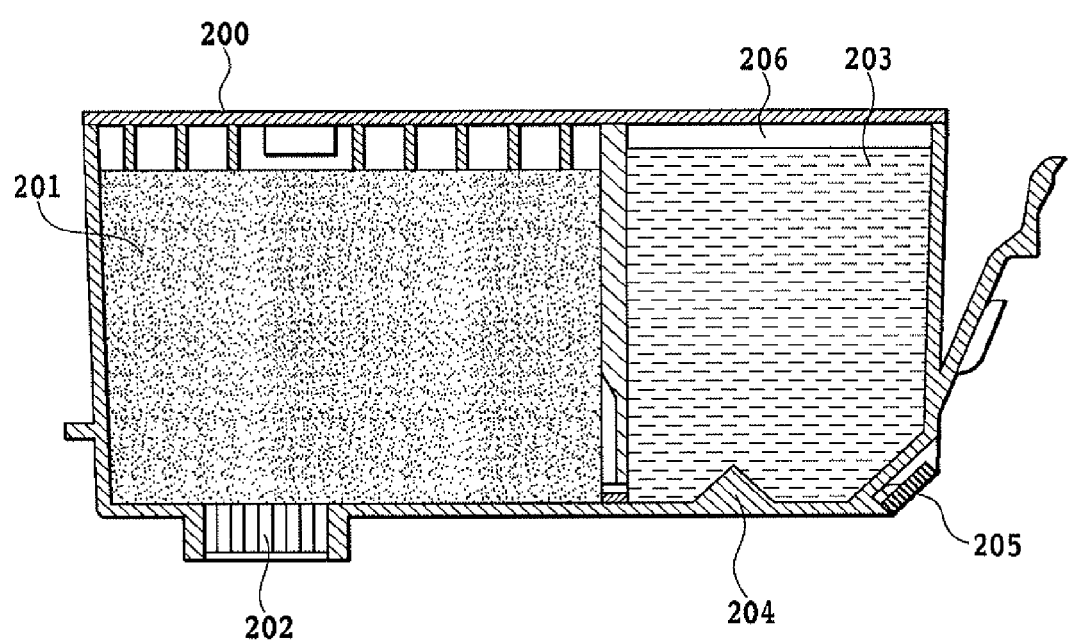
FIG. 2 is a diagram showing an ink tank of the present embodiment.

FIG. 2 is a diagram showing the ink tank used in the present embodiment. An ink tank body 200 is provided with a supply port 202 for feeding ink to the printing head 106, an ink storage portion 206 for storing ink and an ink holding portion 201 for holding ink by an absorption body. In addition, the ink tank body 200 is provided with a triangle optical reflection portion for ink residual quantity detection (hereinafter, simply referred to as reflection portion) 204 formed by a light transmittance state member made of a material such as acrylic and a memory element 205 having access to an outside.

(Method of Detecting an Ink Residual Quantity)

Here, a method of detecting an ink residual quantity used in the present embodiment will be explained. The present embodiment uses the optical sensor 111, which determines presence/absence of ink 203 in the ink tank. At the time of detecting the ink residual quantity, the carriage 101 is transported to a position above the optical sensor 111, thus making the reflection portion 209 of the ink tank mounted on the carriage 101 face the optical sensor 111.

Figure 3:
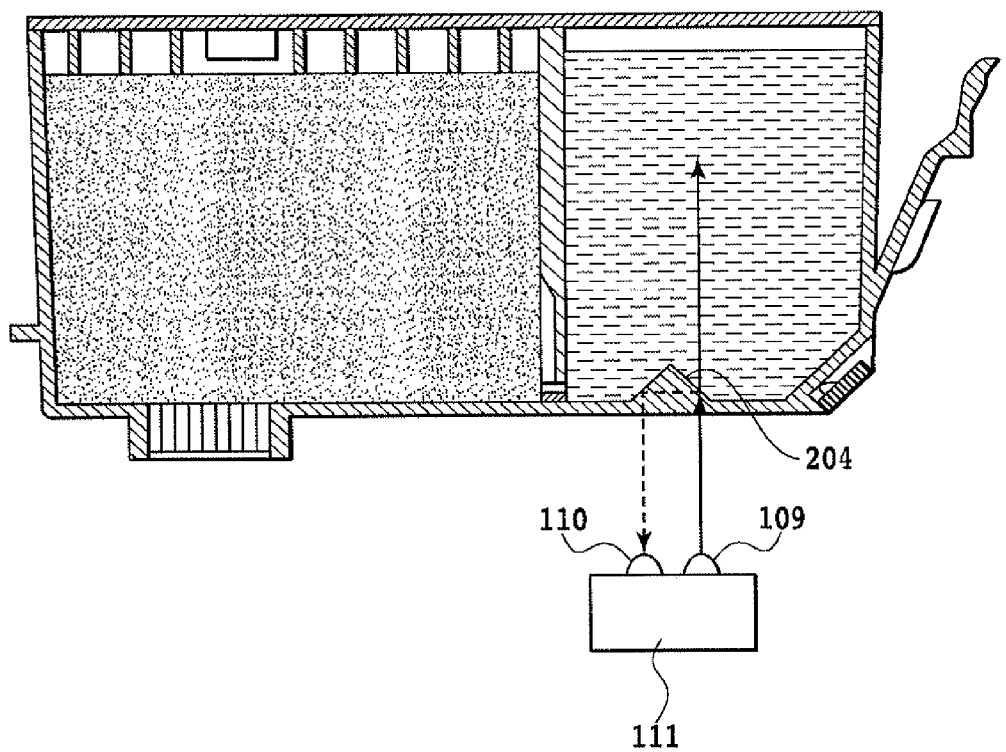
FIG. 3 is a diagram showing a state where an optical sensor in the printing device in FIG. 1 faces a reflection portion of the ink tank in the printing device.

FIG. 3 is a diagram showing a state where the optical sensor 111 faces the reflection portion 204 of the ink tank. When the reflection portion 204 is covered with the ink, that is, when the ink exists therein, since most of light emitted from the light-emitting portion 109, as shown in a solid arrow in FIG. 3, passes through the reflection portion 204 without reflection therein, the light-receiving portion 110 does not nearly receive the light. In addition, when the reflection portion 204 is not covered with the ink, since the light emitted from light-emitting portion 109 of the optical sensor 111, as shown in a broken arrow in FIG. 3, reflects on the reflection portion 204. Therefore, the reflected light is received at the light-receiving portion 110 of the optical sensor. In this way, the light irradiated on the reflection portion 204 is made to reflect thereon by using reflection of the reflection portion 204, thereby detecting a quantity (presence/absence) of the ink inside the ink tank.

(Optical Sensor Circuit)

Figure 4:
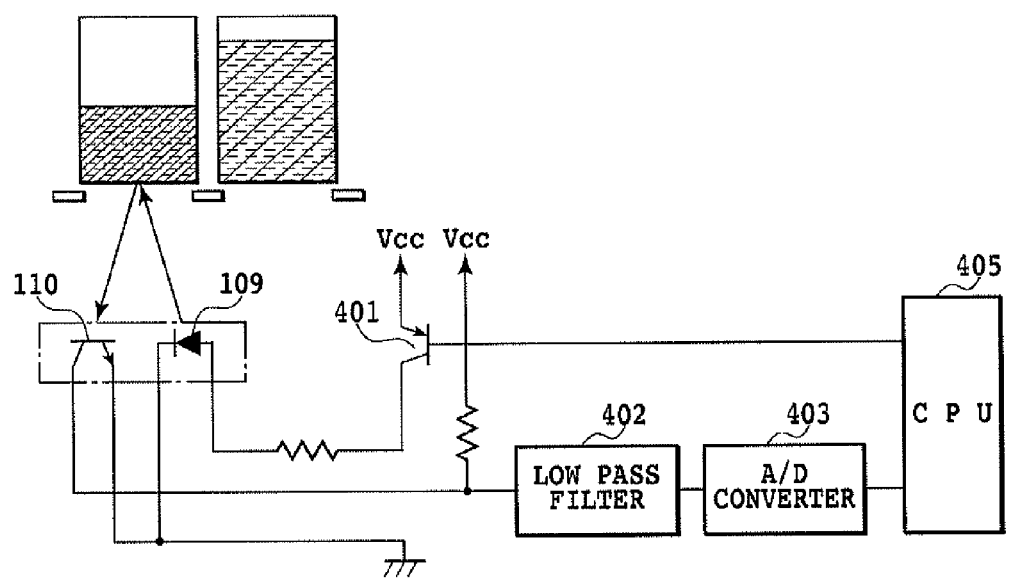
FIG. 4 is a diagram showing a drive circuit of the optical sensor provided on a circuit substrate in the printing device in FIG. 1.

FIG. 4 is a diagram showing a drive circuit of the optical sensor provided on the circuit substrate mounted in the printing device of the present embodiment. The light-receiving portion 110 receiving light emitted from the light-emitting portion 109 detects the light reflected by the reflection portion 204 shown in FIG. 3 of the ink tank and outputs a voltage in accordance with a quantity of the detected light. The outputted voltage is detected through a low pass filter 402 and an A/D converter 403 as a voltage level by CPU 405.

When the ink does not remain in the ink tank, the light emitted from the light-emitting portion 109 is reflected on the reflection plate of the ink tank and is received by the light-receiving portion 110. Therefore, the current flows to light-receiving portion 110. A voltage detected by the CPU 405 is reduced by voltage drop. In addition, when the ink remains in the ink tank, since the light emitted from the light-emitting portion 109 is not reflected on the reflection plate of the ink tank, the voltage detected by the CPU 405 is increased.

Figure 5:
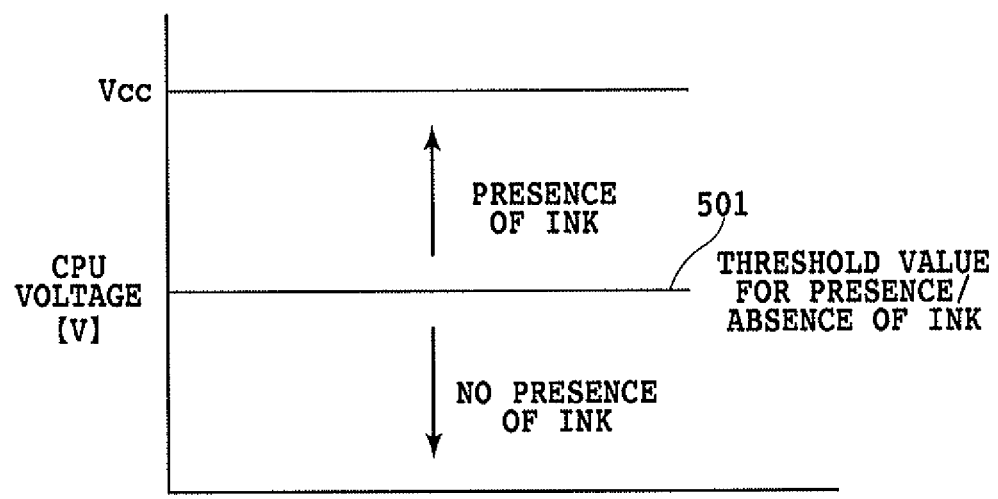
FIG. 5 is a diagram showing a threshold value for determining presence/absence of ink with a voltage of CPU.

FIG. 5 is a diagram showing a threshold value for determining presence/absence of ink with a voltage of CPU 405 in the present embodiment. CPU 405 determines that ink exists when a voltage detected by CPU 405 is higher than a threshold value 501 shown in a solid line in FIG. 5 and that the ink does not exist when the voltage is lower than the threshold value 501.

However, when the light-emitting portion 109 or the light-receiving portion 110 is contaminated by ink mist or the like generated inside the printing device caused by using the printing device, light emitted from the light-emitting portion 109 is made weaker than light actually emitted therefrom caused by the contamination, a quantity of the light received at the light-receiving portion 110 is made small. In consequence, even when the ink does not remain in the ink tank, the voltage detected by the CPU 405 may be more than the threshold value 501. In this case, regardless of no existence of the ink in the ink tank, CPU makes an erroneous determination that the ink exists therein.

For preventing such an erroneous determination by CPU 405, the present embodiment is designed to be provided with an adjustment circuit disposed in each of the light-emitting portion 109 and the light-receiving portion 110, making it possible to adjust a light-emitting quantity and a light-receiving sensitivity.

(Ink Tank Memory Element)

Figure 6:
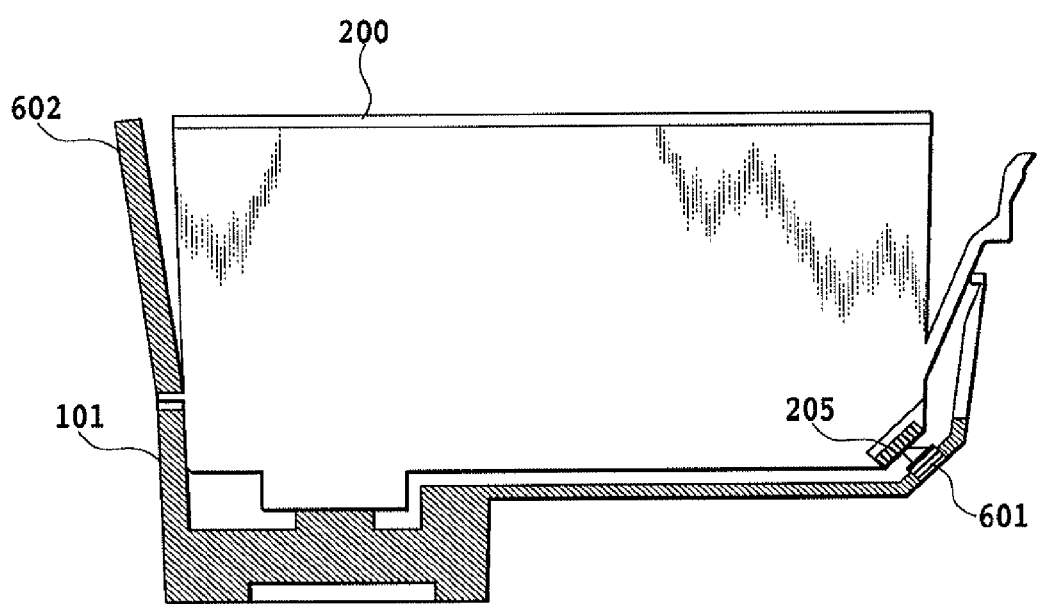
FIG. 6 is a diagram showing an ink tank body mounted in a carriage in the printing device in FIG. 1.

FIG. 6 is a diagram showing an ink tank body 200 mounted in the carriage 101. The ink tank body 200 is provided with the memory element 205. The memory element 205 is designed to be connected to an electrical point 601 of the carriage 101. In addition, the memory element 205 is connected through a carriage holder to the printing device body and is connected through the flexible cable 107 to CPU 405 of a main substrate.

Figure 7:
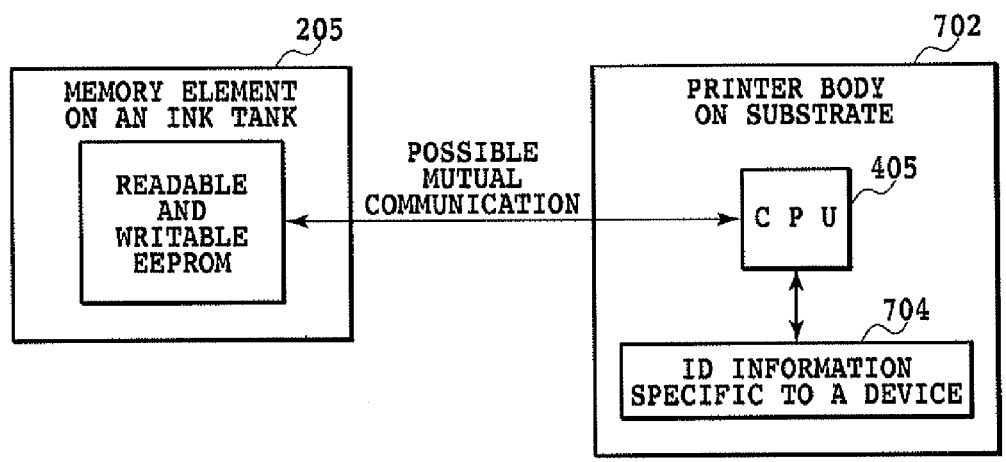
FIG. 7 is a diagram schematically showing a state where a memory element and CPU in the printing device in FIG. 1 are connected.

FIG. 7 is a diagram schematically showing a state where the memory element 205 disposed in the ink tank body 200 and CPU 405 mounted in the printing device body are connected. In general, such a memory element mounted in the ink tank stores the use dot number of ink, color information of the ink tank, specific identification ID and the like, but in the present embodiment, the memory element also serves as EEPROM capable of reading and writing information by CPU 405.

Herein, a memory content of EEPROM will be explained.
(1) Address 0 (device ID): at the time of calibrating the optical sensor, a specific ID of the printer body is written. The address is blank in an initial state.
(2) Address 1 (flag of no ink): in a case where an ink residual quantity is detected and it is determined that ink 203 in the ink tank does not remain, numeral 1 is written. The address is 0 in an initial state.
(3) Address 2 (calibration flag): at the time of calibrating the optical sensor, numeral 1 is written. The address is 0 in an initial state.
(4) Address 3 (PWM value): at the time of calibrating the optical sensor, a PWM (pulse width modulation) value in a light-emitting element at calibration termination is written.

FIG. 8 is a diagram schematically showing a memory content of EEPROM.

(Allotment Processing)

Hereinafter, allotment processing in the present embodiment will be explained. It should be noted that for facilitating an explanation, explanation is made to one ink tank, but the detection can be similarly carried out even in a plurality of ink tanks. In addition, this allotment processing is usually performed in a case where the ink tank is exchanged or in a case where after the printing is carried out in some degrees, it is determined that a residual quantity of the ink is small.

Figure 9:
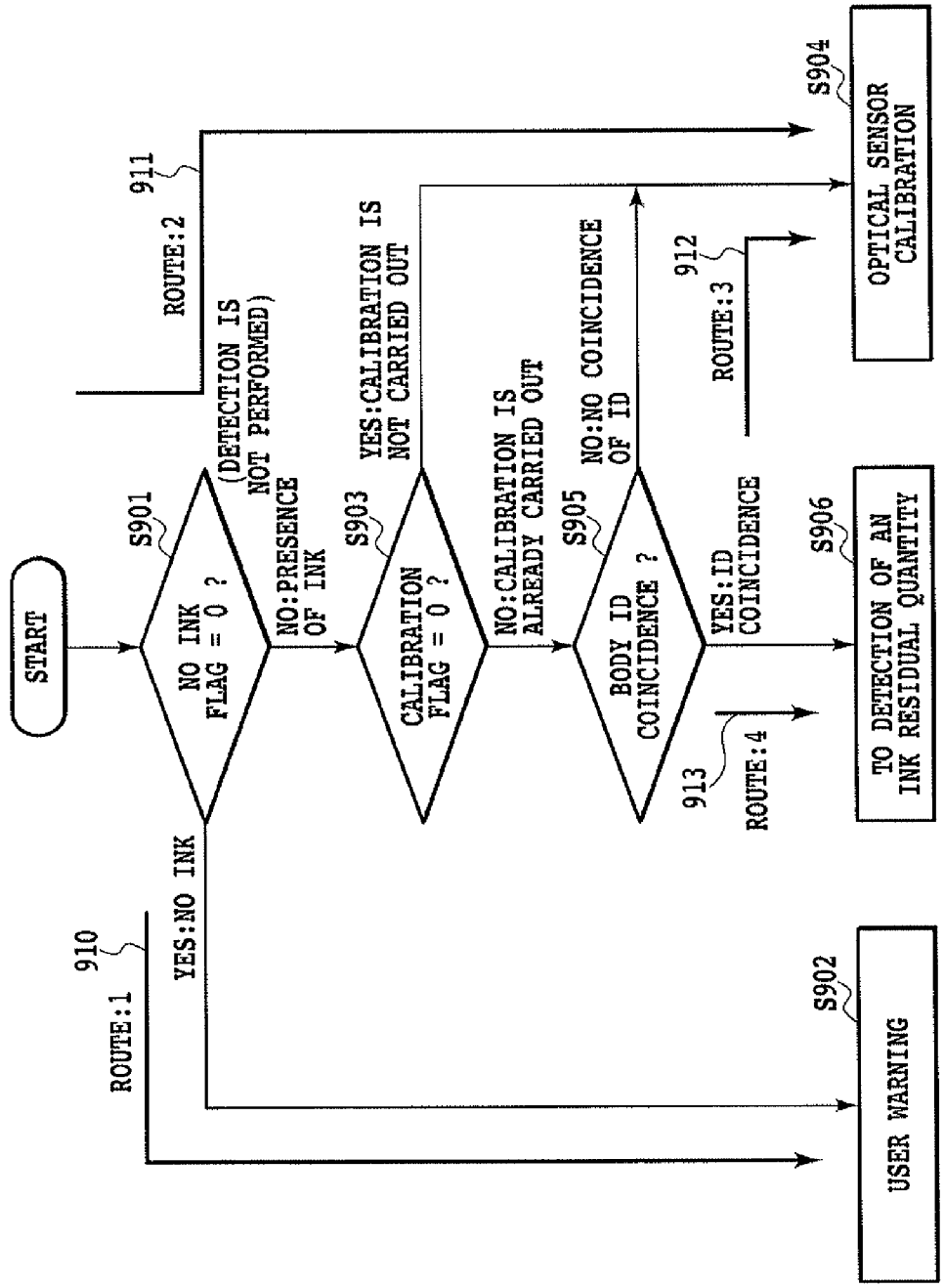
FIG. 9 is a flow chart showing allotment processing by information of the memory element in the present embodiment.

FIG. 9 is a flow chart showing the allotment processing by memory information of the memory element of the ink tank. When this allotment processing starts, at step S901 information (flag of no ink) of the address 1 inside EEPROM is confirmed. In a case where this flag is 1, that is, in a case where the ink residual quantity detection is already carried out in the ink tank and it is determined by the previous ink residual quantity detection that the ink does not exist, the process goes to step S902, wherein a warning of no ink is outputted to a user. In a case where at step S901, the flag is 0, that is, in a case where the ink tank is a new one and the ink residual quantity detection is not carried out yet or in a case where the ink residual quantity detection is carried out, but the ink is still left inside the ink tank at the time of the previous ink residual quantity detection, the process goes to step S903, wherein information (calibration flag) of the address 2 is confirmed. In a case where this flag is 0, that is, when the calibration of the optical sensor is not carried out before, the process goes to step S904.

In a case where it is determined at step S903 that the flag is 1, that is, when it is determined that the calibration of the optical sensor is carried out before, the process goes to step S905. At step S905, information (device ID) of the address 0 is confirmed. Herein, ID (identification) as identification information is confirmed for confirming whether or not a printing device in which the calibration is carried out in the ink tank before is the same as a printing device currently mounted. In a case of no coincidence of the ID, it is determined that the ink tank is a ink tank which is used half way in the other printing device and in which the ink remains, and the process goes to step S904. In a case of the ID coincidence, the process goes to step S906.

A history of the ink tank is found by performing such an allotment processing. That is, the ink tank is to be branched to four routes (910, 911, 912 and 913) shown on the flow chart. The route 1 (910) shows an ink tank in which the ink is already used up. In addition, the route 2 (911) shows that the ink tank can be determined as a new ink tank, since the ink exists in the ink tank and the calibration is not carried out once. In addition, the route 3 (912) shows the ink tank can be determined as an ink tank which is used in the other printing device and is for the first time mounted in the present printing device at this time and where the ink exists, since the ink exists in the ink tank, the calibration is carried out and a specific ID of the device does not correspond. In addition, the route 4 (913) shows that the ink tank can be determined as an ink tank in which the ink residual quantity detection is performed in the present printing device before and it is determined at the previous time that the ink exists.

By carrying out such an allotment, the calibration of the optical sensor to be described later at step S904 can be carried out by using an ink tank to which it is determined that the ink necessarily exists in the ink tank subjected to the processing of the route 2 (911) and the route 3 (912). In addition, since the ink tank subjected to the processing of the route 1 (910) without calibration is identified as an ink tank in which there exists no ink, it is not necessary to perform the ink residual quantity detection. In addition, the ink tank which is subjected to the processing of the route 4 (913) and in which the ink residual quantity detection will be performed afterwards is determined as an ink tank in which the calibration of the optical sensor is already carried out in the present printing device.

(Calibration of the Optical Sensor)

Next, the calibration of the optical sensor will be explained.

Figure 10:
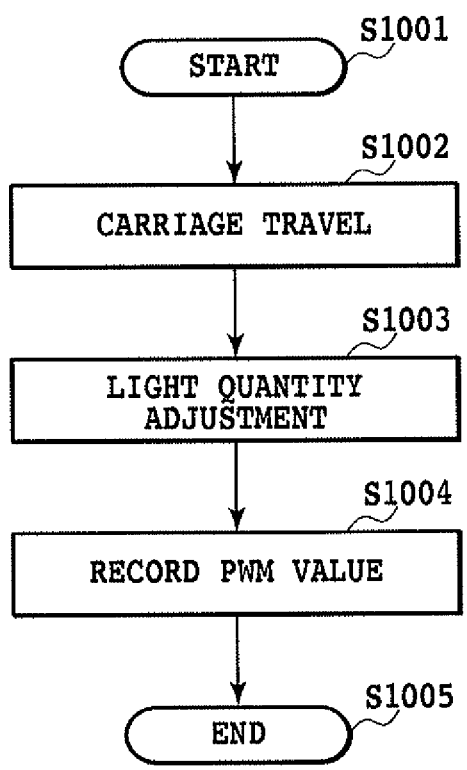
FIG. 10 is a flow chart showing calibration of the optical sensor in the present embodiment.

FIG. 10 is a flow chart showing the calibration of the optical sensor 111 in the present embodiment. The calibration in the present embodiment is carried out by using the optical reflection portion 204 for ink residual quantity detection equipped in the ink tank. Hereinafter, every step in the flow chart in FIG. 11 will be explained.

When a start signal for calibration is received at step S1001, the process goes to step S1002, where the carriage 101 transports the ink tank to a position shown in FIG. 3, that is, to a position opposing the optical sensor 111. When the transportation of the ink tank is completed, at step S1003 light is emitted from the light-emitting element while performing PWM (pulse width modulation), and the light-emitting quantity is adjusted by PWM so that the light-receiving quantity at this time is more than a threshold value 501 for presence/absence of ink, that is, the light-receiving quantity is within a region where it is determined that the ink exists. Specifically, once the light quantity is increased (voltage detected by CPU 405 is decreased) to a region of no ink, then the light quantity is decreased (voltage detected by CPU 405 is increased) and a PWM value is found when the light quantity enters into a region of presence of the ink. Such adjustment can be made since it is found, beforehand, that the ink exists in the ink tank where the calibration of the optical sensor is to be carried out. In this way, the light-emitting quantity of the optical sensor 111 is adjusted by using the reflection portion 204 of the ink tank where it is found, beforehand, that the ink exists therein. Thus, even if the reflection portion 204 is contaminated, presence/absence of the ink can be determined by using the threshold value 501 for presence/absence of a given ink quantity.

After the light-emitting quantity of the light-emitting portion 109 of the optical sensor 111 is adjusted by the PWM, the PWM value after the adjustment is written in the address 3 of the memory element mounted in the ink tank to terminate the calibration.

(Optical Ink Residual Quantity Detection)

Figure 11:
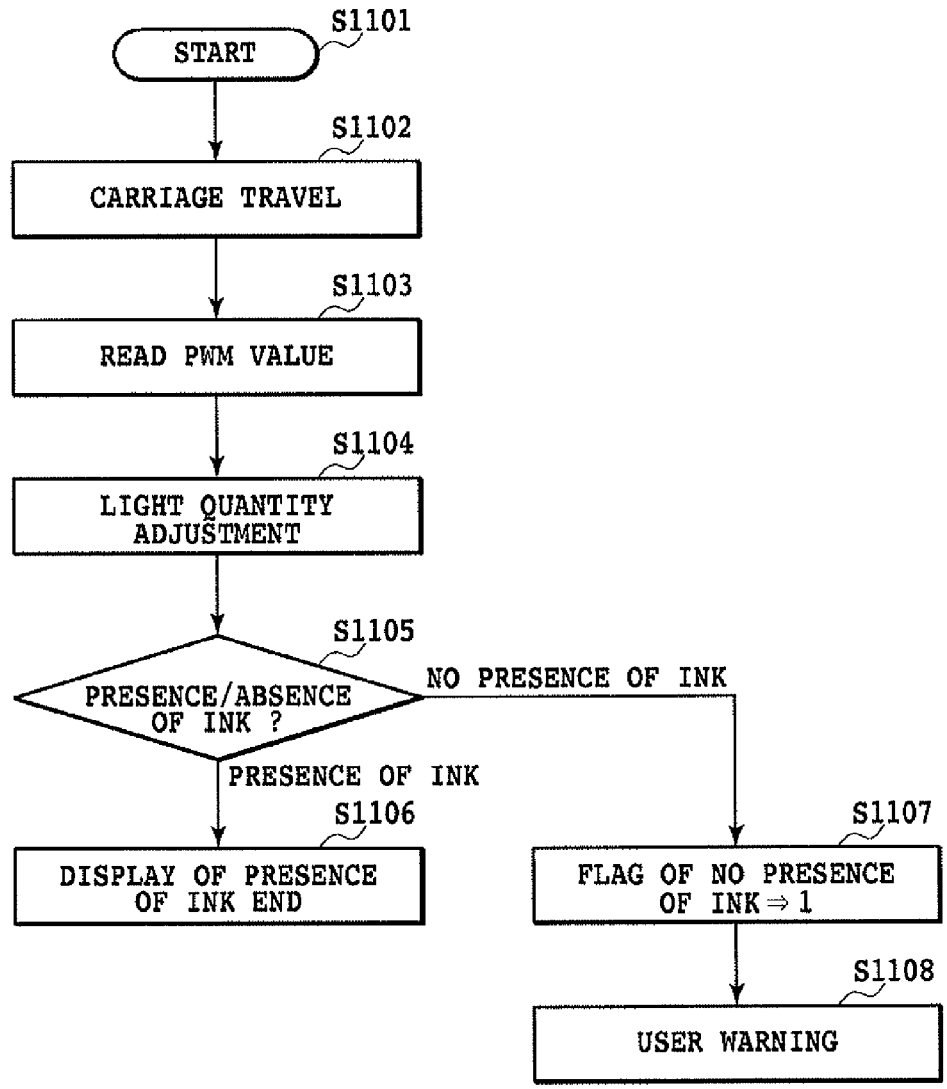
FIG. 11 is a flowchart showing optical ink residual quantity detection in the present embodiment.

FIG. 11 is a diagram showing optical ink residual quantity detection in the present embodiment. The optical ink residual quantity detection to be performed after the processing of the route 4 (913) shown in FIG. 9 is performed based upon the allotment processing by information of the memory element in the ink tank will be explained. At step S901 presence/absence of the ink is confirmed by the information of the memory element in the ink tank, but the confirmation at step S901 is the confirmation for presence/absence of the ink at the previous ink residual quantity detection consistently, and the confirmation of the residual quantity of the ink in the ink tank at this time is not made. Therefore, even if it is determined that ink exists in the ink tank by the previous ink residual quantity detection, the ink tank where the ink is not left at present may go through the route 4 (913) to step S906. Therefore, the present ink residual quantity in the ink tank is confirmed by the optical ink residual quantity detection.

When a start signal of the ink residual quantity detection is received at step S1101, the process goes to step S1102, wherein the carriage 101 transports the ink tank at a position in FIG. 3, that is, to a position opposing the optical sensor 111. In the ink tank which has been subjected to the processing of the route 4 (913), the calibration by the present printing device is already completed. Therefore, at step S1103 CPU 405 reads a PWM value used for light-emitting of the light-emitting portion 109 of the optical sensor 111 from the address 3 of the memory element 205 and at step S1104 a light-emitting quantity of the light-emitting portion 109 is adjusted. In addition, the process goes to step S1105, wherein the ink residual quantity detection inside the ink tank is performed by using the threshold value 501 for presence/absence of the ink in FIG. 5. Here, in a case where the ink does not remain in the ink tank, at step S1107 numeral 1 as the flag of no ink is written in the address 1 and at step S1108 a warning of no ink is outputted to a user to terminate the processing. In addition, in a case where at step S1105 the ink remains in the ink tank, at step S1106 a display of presence of the ink is made to terminate the processing.

According to the present embodiment thus, by performing the allotment processing based upon the ink tank memory element information, the optical sensor is calibrated based upon the detection signal of the light-receiving portion at the time of detecting that the ink does not exist in the ink tank by the optical sensor, in a state where the ink is left in the ink tank. Thereby, the optical sensor including variations of the ink tank reflection plate can be corrected without influence of the contamination of the reflection plate for calibration which is the conventional problem. As a result, even if the optical sensor or the ink tank reflection plate with variations is used, the ink residual quantity detection can be performed with high accuracy and high reliability by high ink-mist resistance.

It should be noted that the control section in relation to calibration in the present embodiment is provided in the printing device, but is not limited to this and may be provided in a host device such as a computer.

In addition, the program for performing the control in the present embodiment may be provided in the printing device or the host device. Further, the program may be performed by the storage medium for storing the program code performing the control in the present embodiment which is readable by the printing device or the host device.

In addition, in the present embodiment, calibration of the optical sensor is carried out by adjusting a light-emitting quantity of the optical sensor, but may be carried out by adjusting light-receiving sensitivity.

While the present invention has been described with reference to exemplary embodiments, it is to be understood that the invention is not limited to the disclosed exemplary embodiments. The scope of the following claims is to be accorded all such modifications and equivalent structures and functions.

This application claims the benefit of Japanese Patent Application No. 2007-119909 filed Apr. 27, 2007, which is hereby incorporated by reference herein in its entirety.

What is claimed is:

1. A control method for an ink jet printing apparatus including an ink tank that stores ink, a light-emitting portion that emits light in a predetermined light-emitting quantity to a reflection portion of the ink tank, a light-receiving portion that receives reflected light from the reflection portion, and a determining portion that determines an absence of ink inside the ink tank if an amount of received light received by the light-receiving portion is equal to or greater than a predetermined amount, and determines a presence of ink inside the ink tank if an amount of received light received by the light-receiving portion is less than the predetermined amount, the control method comprising:

moving the reflection portion of the ink tank into a position facing the light-emitting portion;

emitting light in the predetermined light-emitting quantity toward the light-receiving portion from the light-emitting portion;

increasing a light-emitting quantity until the amount of light received by the light-receiving portion is greater than the predetermined amount;

decreasing a light-emitting quantity until the amount of light received by the light-receiving portion becomes equal to the predetermined amount;

changing the predetermined light-emitting quantity to be the light-emitting quantity which caused the amount of light received by the light-receiving portion to be equal to the predetermined amount; and storing the light-emitting quantity that has changed in a storage unit that is provided on the ink tank.

2. A printing device which records an image by using ink, the printing device comprising:

an ink tank configured to store ink;

a light-emitting portion configured to emit light in a predetermined light-emitting quantity to a reflection portion of the ink tank;

a light-receiving portion configured to receive reflected light from the reflection portion;

a carriage configured to move the reflection portion of the ink tank into a position facing the light-emitting portion;

a determination portion configured to determine an absence of ink inside the ink tank if an amount of received light received by the light-receiving portion is equal to or greater than a predetermined amount, and determine a presence of ink inside the ink tank if an amount of received light received by the light-receiving portion is less than the predetermined amount; and a control unit configured to:

(i) increase a light-emitting quantity of the light-emitting portion until the amount of light received by the light-receiving portion is greater than the predetermined amount, (ii) decrease a light-emitting quantity until the amount of light received by the light-receiving portion becomes equal to the predetermined amount, (iii) change the predetermined light-emitting quantity to be the light-emitting quantity which causes the amount of light received by the light-receiving portion to be equal to the predetermined amount, and (iv) store the light-emitting quantity that has changed in a storage unit that is provided on the ink tank.

3. The control method according to claim 1, further comprising storing, in the storage unit, information on whether an operation was performed to change the amount of light emitted from the light emitting portion to the ink tank.

4. The control method according to claim 3, further comprising storing, in the storage unit, information on an ink jet printing apparatus which performed the operation of changing the amount of light emitted from the light emitting portion.

5. The printing device according to claim 2, wherein the storage unit stores information as to whether an operation was performed to change the amount of light emitted from the light emitting portion to the ink tank.

6. The printing device according to claim 5, wherein the storage unit stores information on an ink jet printing apparatus which performed the operation of changing the amount of light emitted from the light emitting portion.

* * * * *